US012181138B2

(12) United States Patent
Koch et al.

(10) Patent No.: US 12,181,138 B2
(45) Date of Patent: Dec. 31, 2024

(54) LUMINAIRE HAVING A DATA TRANSMISSION FUNCTION

(71) Applicant: Tridonic GmbH & Co KG, Dornbirn (AT)

(72) Inventors: Patrik Yves Koch, Dornbirn (AT); Frank Lochmann, Dornbirn (AT); Markus Schertler, Dornbirn (AT); Patrick Schnell, Dornbirn (AT); Lukas Simma, Dornbirn (AT); Patrick Walch, Dornbirn (AT); Markus Mayrhofer, Dornbirn (AT); Thomas Zengerle, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 183 days.

(21) Appl. No.: 17/767,076

(22) PCT Filed: Oct. 7, 2020

(86) PCT No.: PCT/EP2020/078065
§ 371 (c)(1),
(2) Date: Apr. 7, 2022

(87) PCT Pub. No.: WO2021/069473
PCT Pub. Date: Apr. 15, 2021

(65) Prior Publication Data

US 2022/0364714 A1 Nov. 17, 2022

(30) Foreign Application Priority Data

Oct. 7, 2019 (DE) ..................... 10 2019 126 868.0

(51) Int. Cl.
*H01Q 13/10* (2006.01)
*F21V 23/04* (2006.01)
*H01Q 1/22* (2006.01)
*H01Q 13/18* (2006.01)
*F21Y 115/10* (2016.01)

(52) U.S. Cl.
CPC ........... *F21V 23/0435* (2013.01); *H01Q 1/22* (2013.01); *H01Q 13/10* (2013.01); *F21Y 2115/10* (2016.08)

(58) Field of Classification Search
CPC ...... F21V 23/0435; H01Q 1/22; H01Q 13/10; H01Q 13/16; H01Q 13/18; H01Q 1/44;
(Continued)

(56) References Cited

U.S. PATENT DOCUMENTS

2014/0218913 A1 8/2014 Cozzolino et al.
2015/0103515 A1* 4/2015 Bosua ..................... F21K 9/232
362/373

(Continued)

FOREIGN PATENT DOCUMENTS

CN 102097676 A 6/2011
DE 10 2011 007 416 10/2012

(Continued)

OTHER PUBLICATIONS

PCT/EP2020/078065, International Search Report and Written Opinion, 15 pages and English Translation, 6 pages.

(Continued)

*Primary Examiner* — Minh D A
(74) *Attorney, Agent, or Firm* — Andrus Intellectual Property Law, LLP

(57) ABSTRACT

The present invention relates to a luminaire having at least one illuminant (6), a luminaire housing (1), and at least one operating device (4), arranged in the luminaire housing (1), for the at least one illuminant (6), wherein the operating device (4) has an antenna (5) for transmitting and receiving a radio signal, and the luminaire housing (1) has at least one slot antenna (2) that is coupled to the antenna (5) of the operating device (4) by means of radiation coupling, a
(Continued)

waveguide, or a cavity resonator in order to transmit the radio signal to outside the luminaire housing (1).

14 Claims, 7 Drawing Sheets

(58) Field of Classification Search
CPC ........ H01Q 1/38; H01Q 1/50; F21Y 2115/10; F21S 8/04
See application file for complete search history.

(56) References Cited

U.S. PATENT DOCUMENTS

| | | | | |
|---|---|---|---|---|
| 2016/0069551 | A1 | 3/2016 | Ando et al. | |
| 2016/0072176 | A1 | 3/2016 | Van Dijk et al. | |
| 2016/0223153 | A1* | 8/2016 | Van Dijk ............... | H05B 47/19 |
| 2017/0374724 | A1* | 12/2017 | Liszt .......................... | F21V 7/24 |
| 2019/0260112 | A1* | 8/2019 | Azad ........................ | H01Q 9/42 |

FOREIGN PATENT DOCUMENTS

| | | |
|---|---|---|
| WO | 2012089355 | 7/2012 |
| WO | 2015024917 | 2/2015 |
| WO | 2018158096 | 9/2018 |

OTHER PUBLICATIONS

AU GM 50219/2019, Australian Search Report dated Jan. 11, 2024, 1 page.

* cited by examiner

LUMINAIRE HAVING A DATA TRANSMISSION FUNCTION

CROSS REFERENCE TO RELATED APPLICATIONS

The present application is the U.S. national stage application of international application PCT/EP2020/078065 filed Oct. 7, 2022, which international application was published on Apr. 15, 2021 as International Publication WO 2021/069473 A1. The international application claims priority to German Patent Application No. 10 2019 126 868.0 filed Oct. 7, 2019.

FIELD OF THE INVENTION

The invention relates to a luminaire by means of which data or control signals can be transmitted wirelessly.

BACKGROUND OF THE INVENTION

In building automation, control devices receive signals from sensors and transmit control signals to luminaires or other devices via cables or by means of wireless transmission methods.

WO 2012/089355 A1 discloses a safety or emergency lighting system in which a control device transmits radio signals for performing the prescribed regular function checks to the safety lights directly or by means of repeaters.

A lighting system in which ceiling lights are equipped with a radio network module in order to provide Internet access for WLAN-enabled devices is disclosed in DE 10 2011 007 416 A1.

Modern luminaires generally have operating devices/converters, which provide the current that the illuminant needs or the operating voltage for the illuminant, monitor the function of the illuminant, and enable dimming or changing of the light's color. In addition, operating devices can be connected to a network for controlling several components of an illumination system, via which they receive commands and/or parameters for controlling or operating the illuminant and send status messages. The transmission of the control signals and data is increasingly carried out wirelessly—in particular, with WIFI or Bluetooth applications.

The problem in this case is that the antenna required for data transmission is generally arranged on the operating device, and integrating the operating device in a metallic housing of a luminaire is not possible due to the shielding effect of the housing against radio signals. In addition, antennas mounted on the outside of the luminaire housing are usually undesirable for aesthetic reasons and require protection from contact. Significant limitations in the design of luminaires with integrated radio communication must therefore be accepted.

SUMMARY OF THE INVENTION

The aim of the invention is to provide a luminaire which solves the described problems. The aim is in particular to provide a luminaire with which control signals and/or data can, using a stable radio link, be transmitted between an operating device in the interior of the luminaire and a communications partner.

This aim is achieved according to the features of independent claim 1. The invention is further developed by the features of the dependent claims.

According to the present invention, a luminaire has at least one illuminant, a metallic luminaire housing, and at least one operating device, arranged inside the luminaire housing, for the at least one illuminant, wherein the operating device has an antenna for transmitting and/or receiving a radio signal, and at least one slot antenna is formed in the luminaire housing, said slot antenna being coupled, by means of radiation coupling, via a waveguide, or a cavity resonator, to the antenna of the operating device in order to transmit the radio signal to outside the luminaire housing. The slot antenna has in particular a length that corresponds to half the wavelength of the radiation used for the radio transmission.

The slot antenna enables radio transmission between an antenna, arranged in the interior of the luminaire with a metallic housing, and an outside device arranged remotely from the luminaire, and can be easily integrated into the metallic luminaire housing and is unobtrusive or usually not recognizable as an antenna. This improves the degrees of freedom in the design of the luminaire.

In the case of radio transmission, signals for controlling the luminaire or the operating device, signals for configuring the luminaire or the operating device, and/or messages from the luminaire or the operating device can be transmitted.

Additionally or alternatively, the luminaire can have a repeater function in which radio signals received in the interior of the luminaire are forwarded by means of the slot antenna and the operating device or another radio device, and/or serve as a base station for WLAN-enabled devices and/or DECT telephones.

During radiation coupling, the slot antenna and the antenna are coupled in the interior of the luminaire over the air, wherein the electrical component of the electromagnetic field generated by the antenna impinges on the slot or the feed point at a right angle to the slot orientation. The electromagnetic field which arises in this way at the slot stimulates the slot geometry to emit electromagnetic radiation at a corresponding frequency. For this purpose, the position and the orientation of the slot antenna and the antenna arranged in the interior of the luminaire are coordinated with one another.

Alternatively, the slot antenna is coupled or fed by means of a waveguide which leads from the antenna arranged in the interior of the luminaire to the slot antenna, or via the luminaire housing, which forms a cavity resonator.

The slot antenna can be a slot group antenna having several slots in order to achieve directivity of the antenna.

The slot antenna can be arranged on any side of the luminaire housing, provided, however, that the position of the slot antenna and the antenna of the operating device relative to one another must remain such that the slot antenna lies in (or close to) the amplitude maximum of the antenna of the operating device. If the illumination direction and the desired emission direction of the slot antenna are virtually the same, the slot antenna can be arranged on the side of the luminaire housing on which the at least one illuminant is arranged.

In addition, the luminaire can have several illuminants, wherein the illuminants and the slots are arranged alternatingly next to one another on the side of the luminaire housing. The illuminants can be light-emitting diodes (LED's) arranged in a strip shape, wherein in each case a slot of the slot antenna is arranged between two LED strips. In this way, the slot antenna can be integrated very inconspicuously and enable improved air movement/cooling in the region of the LED's.

The luminaire can have a transparent cover which covers the slot antenna and the at least one illuminant Therefore, no additional coverage of the slot antenna is necessary in order to achieve a high level of IP protection (protection against contact, protection against dust and water).

The slot length of the slot antenna can correspond to half or a multiple of half the wavelength of the radio signal.

The operating device can have a housing on which the antenna is arranged for transmitting and receiving the radio signal.

At least one slot antenna, which is coupled to the antenna of the operating device by means of the radiation coupling, the waveguide, or the cavity resonator, can in each case be arranged on at least two different sides of the luminaire housing.

Alternatively or additionally, the luminaire can have several of the operating devices and several of the slot antennas, wherein each antenna is coupled to another slot antenna by means of the radiation coupling, the waveguide, or the cavity resonator.

The slot of the slot antenna can be open or at least partially closed or filled with a dielectric filler material, wherein the dielectric material is arranged in the slot and/or covers the slot at least on one side of the slot of the slot antenna (inner side and/or outer side of the luminaire housing).

Closing the opening of the slot antenna with a dielectric makes it possible to meet high demands with regard to the dust and splash protection of the luminaire. In addition, the physical effect results that the length of the slot can be reduced, wherein the size of the effect depends upon which material is used as the dielectric. By filling or covering the slot with the dielectric material, dust edges on the outside of the luminaire can be prevented.

The slot of the slot antenna does not have to have a rectangular shape (including rounded stretching). This allows easy integration of the slot antenna even in small luminaires and luminaires with round, oval, or non-straight shapes. In particular, the slot of the slot antenna can run in its main extension direction at least partially parallel to an edge of the luminaire, wherein the edge can, for example, be an edge of the luminaire housing or an edge of a transparent cover of the luminaire.

Alternatively or additionally, the slot can be at least part of a character attached to the luminaire, such as a logo, a number, or a letter, or can represent at least part of the character by its shape.

BRIEF DESCRIPTION OF THE DRAWINGS

The invention is explained in more detail in the following using the accompanying drawings. The following are shown.

Components having the same functions are denoted by the same reference signs in the figures.

DETAILED DESCRIPTION

Figure 1:
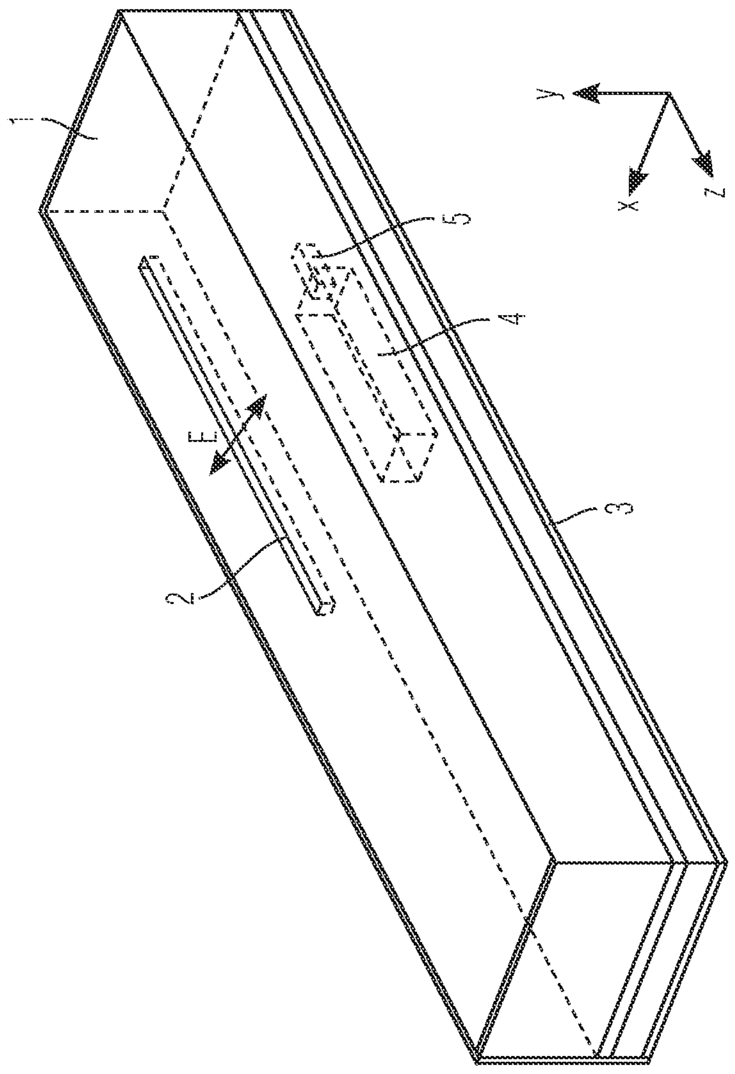
FIG. 1 is a first exemplary embodiment of a luminaire according to the present invention.

FIG. 1 shows a luminaire according to the present invention in a simplified spatial representation. The luminaire has a metallic housing 1, a slot 2 located in the upper side of the box-shaped housing 1, an illuminant (not shown) located on the lower side of the luminaire, a transparent cover 3 covering the illuminant, and an operating device 4, arranged in the interior of the luminaire, for the illuminant.

Figure 2:
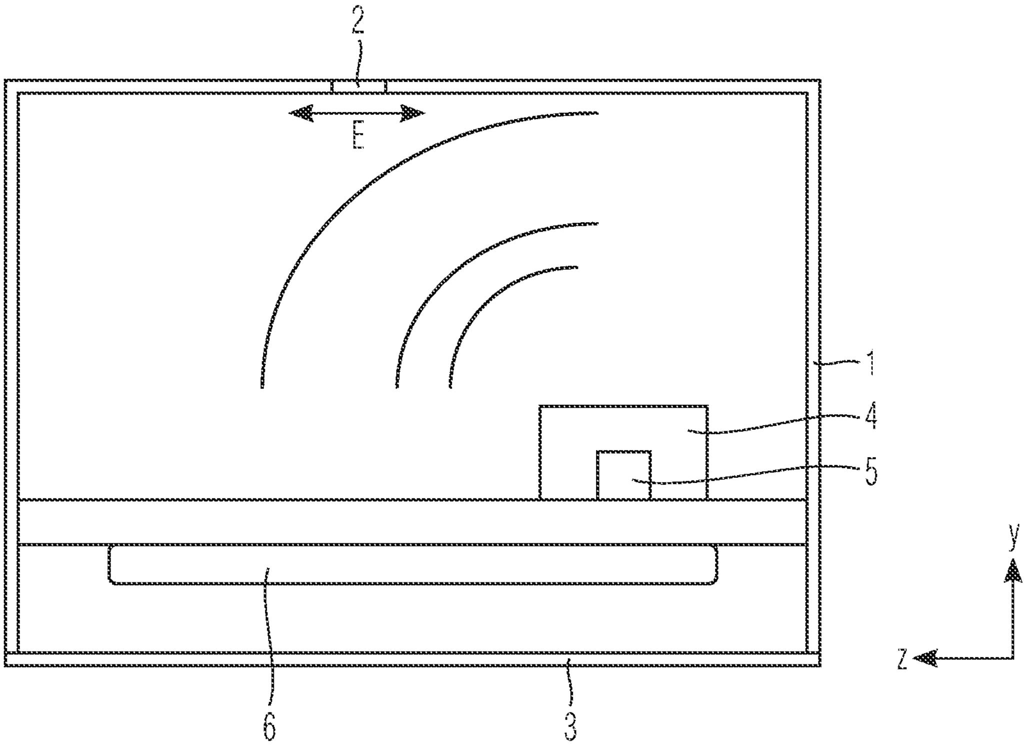
FIG. 2 is a side view of the luminaire shown in FIG. 1.

The illuminant can be an LED module, wherein the operating device 4 provides the current required for the LED's. FIG. 2 shows a side view of the luminaire, shown in FIG. 1, with the illuminant 6.

In addition, the operating device 4 can wirelessly receive data for configuring the operating device 4 (specification of the maximum operating current and/or the light temperature) and for controlling the luminaire (input/output commands or dimming level) from an external control device, and/or wirelessly transmit information to the control device on the current configuration and the current operating status. For this purpose, the operating device 4 has an antenna 5, which can be a Bluetooth or WLAN antenna, and emits or receives a corresponding radio signal.

The slot 2 located in the upper side of the metallic housing 1 and extending through the metallic housing forms a slot antenna which is fed or excited by the radio signal of the operating device 4 or an incoming signal, and which in turn radiates said signal to the outside (outside the luminaire) or inwards to the antenna 5. The antenna 5 and the slot antenna are arranged relative to one another in such a way that the electromagnetic radiation emitted by the antenna 5 generates an electric field E which impinges on the feed point of the slot antenna 2 at a right angle (radiation coupling). The slot length corresponds to half or a multiple of half the wavelength of the radio signal ($\lambda/2$ or $n*\lambda/2$), which corresponds to a length of 6.25 cm or n*6.25 cm at a radio signal frequency of 2.4 GHz. In order to enable precise positioning of the operating device and thus to enable efficient coupling, elements can be provided in the luminaire which establish the installation position of the operating device 4. For example, receptacles or stops are formed inside the metallic housing 1.

As an alternative to direct radiation coupling, coupling can take place by means of a waveguide which leads from the antenna 5 to the slot antenna 2, or a cavity resonator formed by the luminaire housing, which cavity resonator is excited by the antenna 5 and generates the electric field E.

Figure 3:
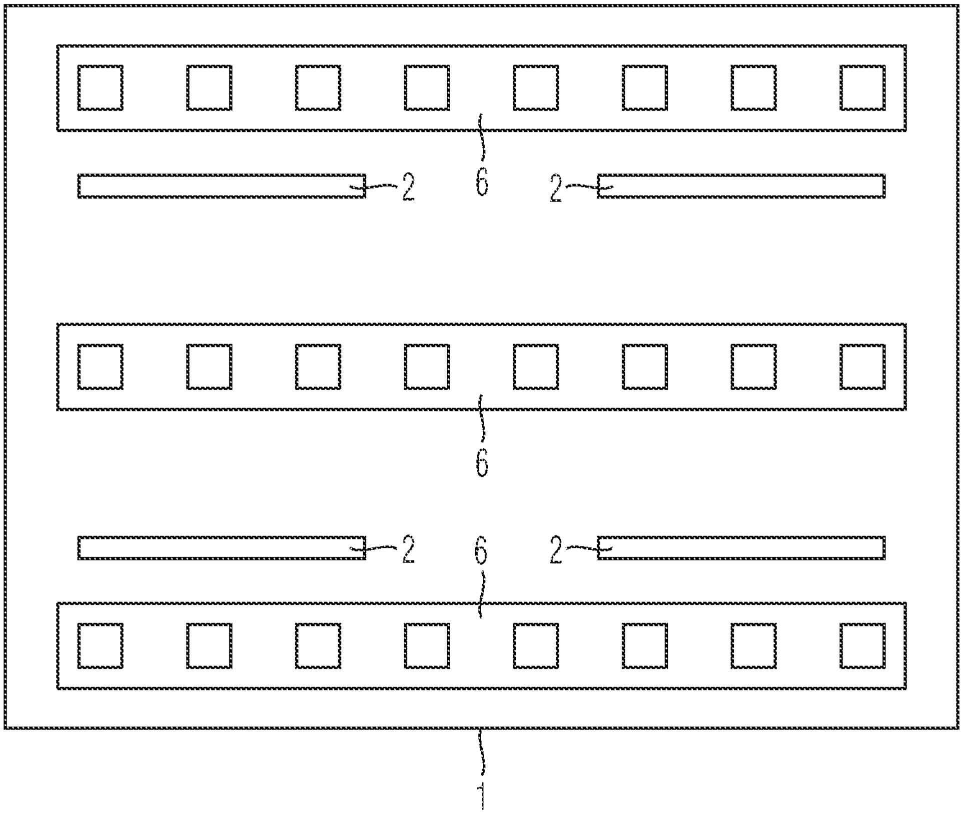
FIG. 3 is a cutout of an arrangement of antenna slots and LED's on the luminaire housing.

The slot antenna can have several slots in order to achieve directivity. FIG. 3 shows such an arrangement having four slots 2, in which the slots 2 and three illuminants 6 are arranged on the same side of the housing 1. The illuminants 6 are designed as strip-shaped LED modules with eight LED's in each case. The slots 2 are arranged between the illuminants 6 (LED modules). The distance between two slots 2, which run parallel with respect to their main extension direction, is greater than $\lambda/2$.

Figure 4:
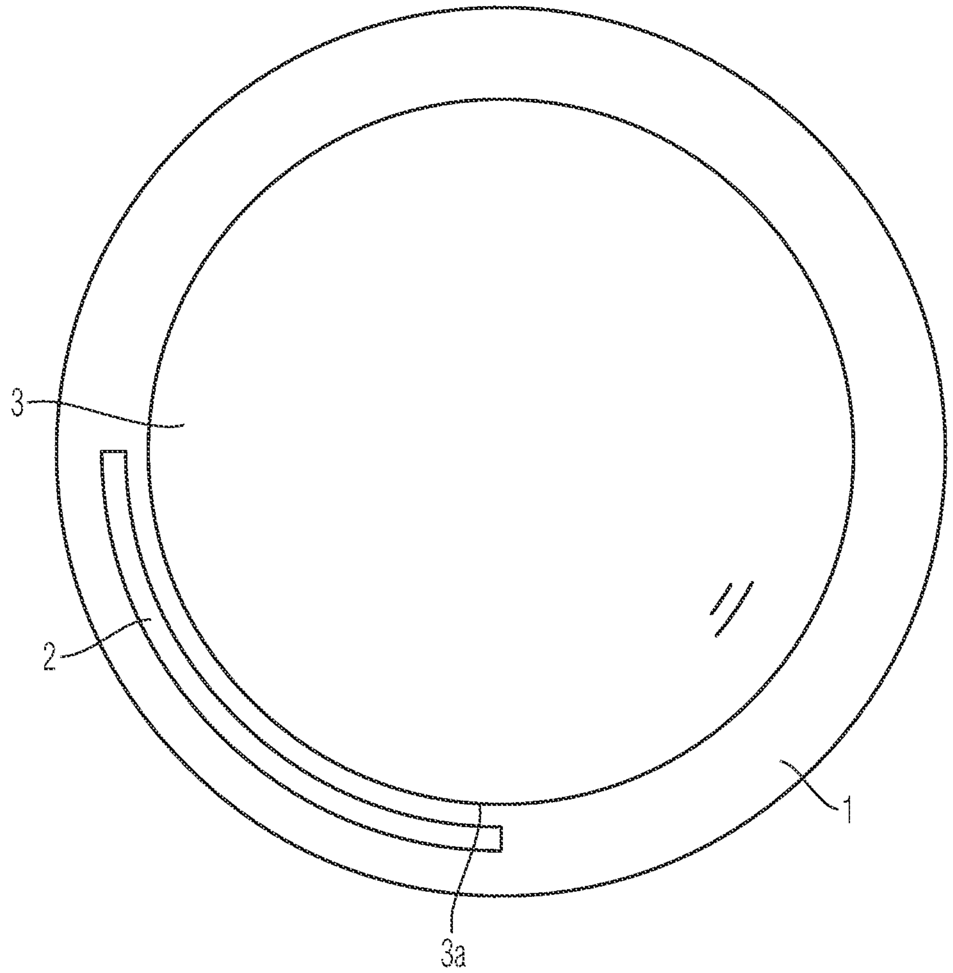
FIG. 4 is a second exemplary embodiment of a luminaire according to the present invention.
Figure 5A:
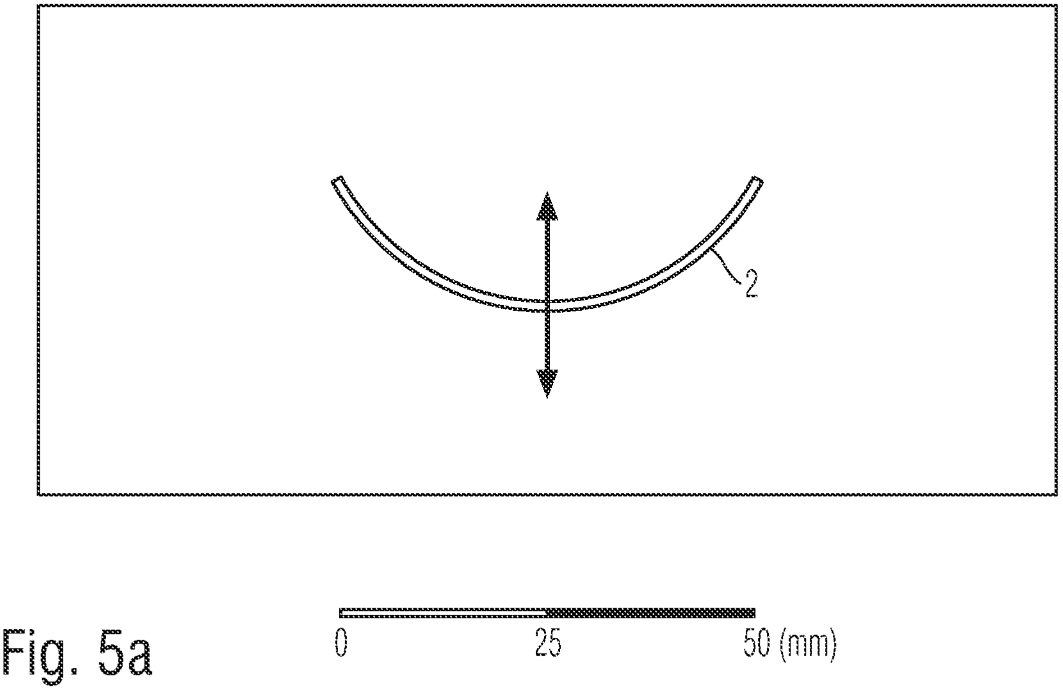
FIGS. 5*a* through 5*f* are slot antennas 2 in different shapes for a luminaire according to the present invention.
Figure 5B:
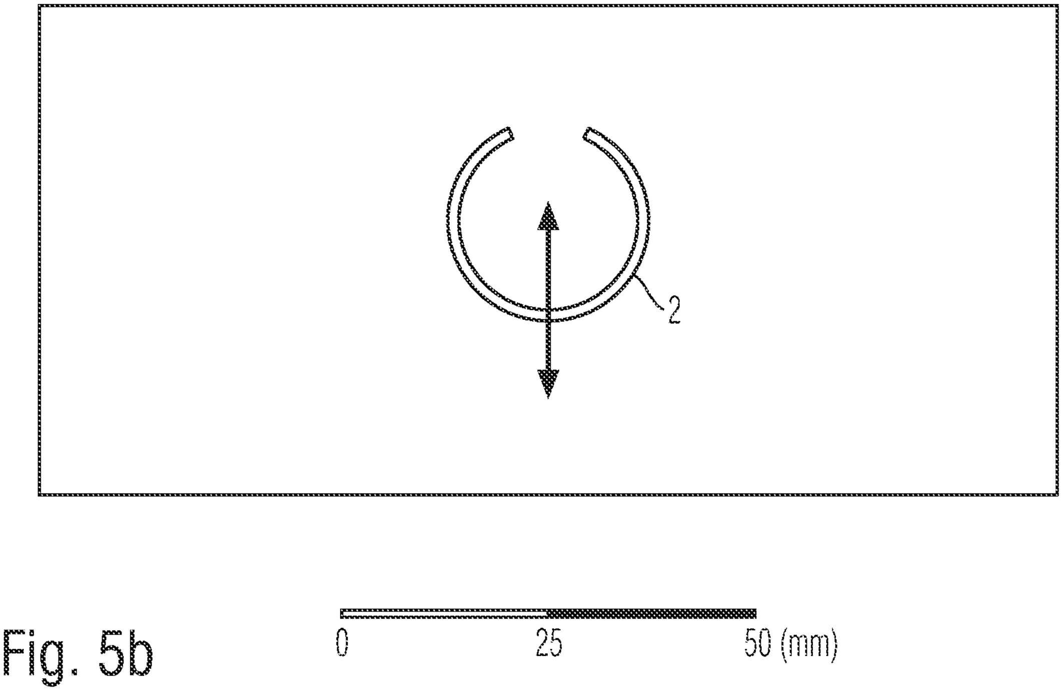
Figure 5C:
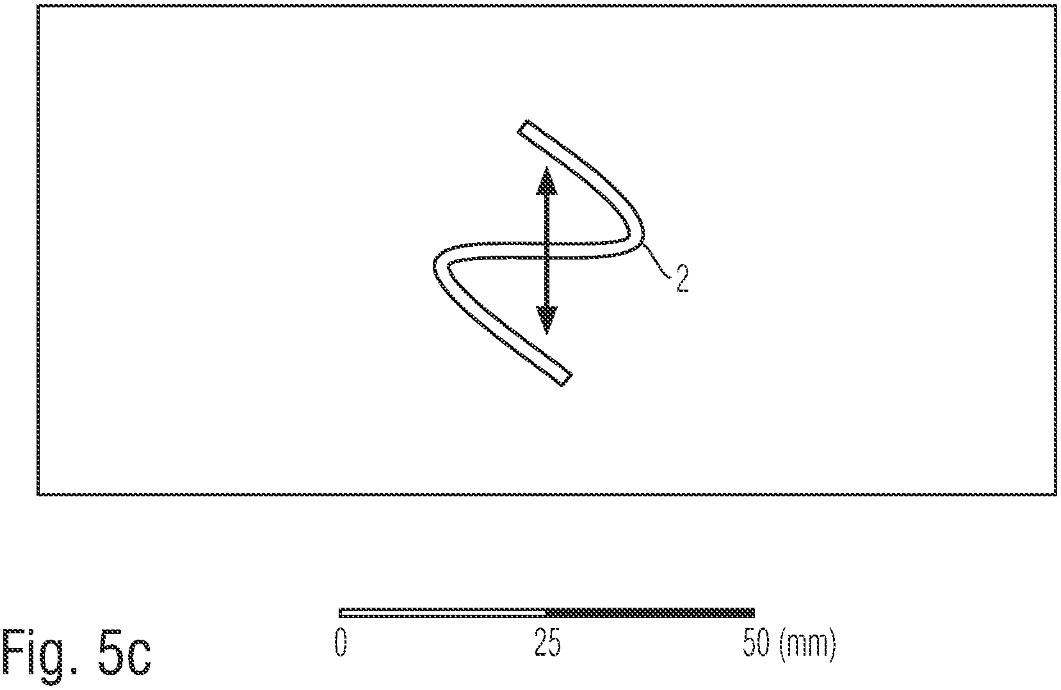
Figure 5D:
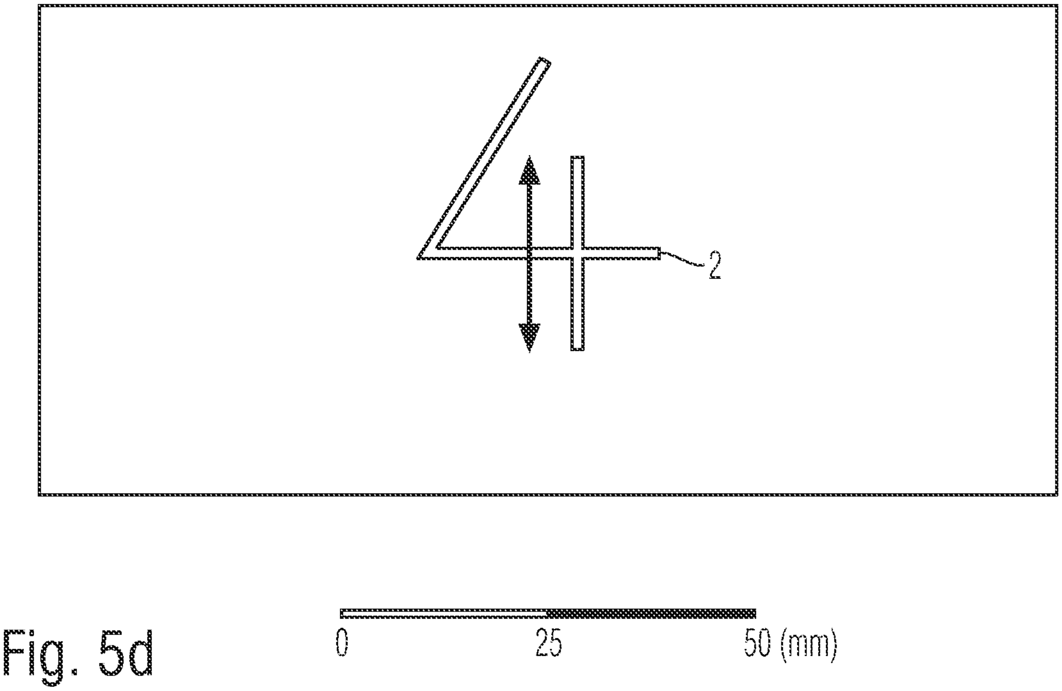
Figure 5E:
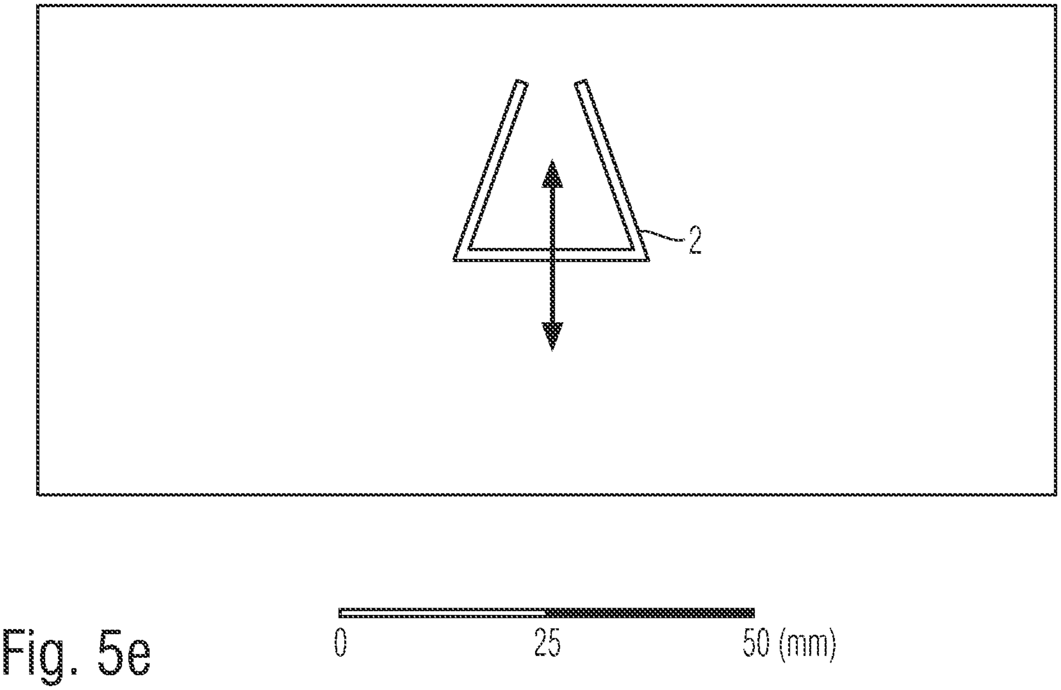
Figure 5F:
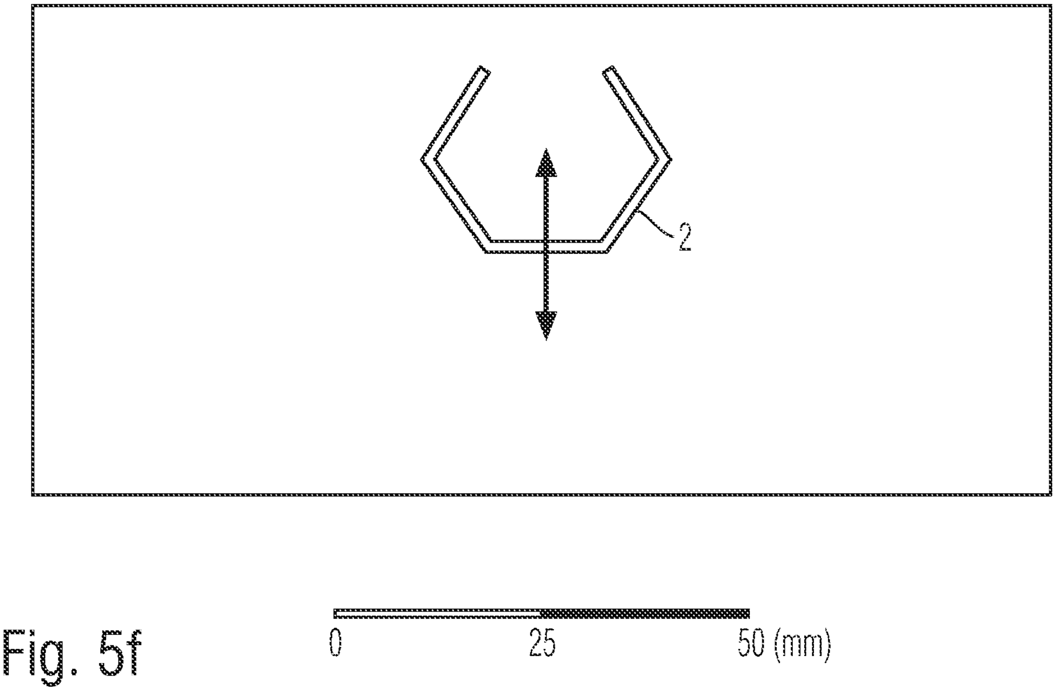

FIG. 4 shows a luminaire according to the present invention, in which the slot antenna 2 is not rectangular. The luminaire shown in FIG. 4 has a circular, metallic housing 1, a circular, arc-shaped slot 2 located on the upper side of the round housing 1, an illuminant (not shown), a transparent, round cover 3 covering the illuminants, and the operating device 4 (not shown), arranged in the interior of the luminaire, for the illuminant.

The slot 2 forming the slot antenna has a uniform width and runs parallel to the outer edge 3*a* of the round cover 3, wherein the circumference of the circular arc is selected such that the length of the straight lines between the ends of the circular arc corresponds to half or a multiple of half the wavelength of the radio signal ($\lambda/2$ or $n*\lambda/2$). The antenna 5 of the operating device 4 is coupled as described above.

FIGS. 5*a* through 5*f* show slot antennas 2 in different shapes with the dimensions for a radio signal frequency of 2.4 GHz, wherein the arrows indicate the respective orientation of the electromagnetic field. As shown in FIGS. 5*c* through 5*f*, the shape of the slot antenna 2 can correspond to a character which serves, for example, to identify the luminaire or the manufacturer.

In the described exemplary embodiments, the slot antenna 2 is formed on one of the sides of the housing 1. However, it is also possible, at least on two different sides of the housing 1, to arrange in each case at least one slot antenna 2, which are coupled to the antenna of the operating device 4 by means of the radiation coupling, the waveguide, or the cavity resonator.

Alternatively, several operating devices 1 and/or another device with a radio function (repeater, radio network module for wireless Internet access) can be arranged in the luminaire, wherein each device antenna is coupled to another slot antenna 2 by means of the radiation coupling, the waveguide, or the cavity resonator.

The position of the operating device 4 is selected, taking into account the position of its antenna 5 in the housing 1 of the luminaire, so that optimal excitation of the slot antenna 2 is possible. For different operating devices 4, different positioning aids can be provided in the housing for this purpose, so that several configurations are possible by means of only one luminaire housing, and, in particular, operating devices 4 can also be used which use different radio signals (Bluetooth, WiFi).

In the described exemplary embodiments, the slot 2 forming the slot antenna can be open, or be closed with a dielectric filler material. The electrical material can either be limited to the open region of the slot or can be applied to the inner and/or exterior of the housing. The material applied to an area preferably has a relief-like surface, so that the electrical material penetrates into the open region of the slot.

The invention claimed is:

1. A luminaire, having:
- at least one illuminant (6),
- a metallic luminaire housing (1), and
- at least one operating device (4), arranged in the metallic luminaire housing (1), for the at least one illuminant (6), wherein
- the operating device (4) has an RF antenna (5) for transmitting a radio signal having a wavelength, and
  - the luminaire housing (1) has a slot antenna (2) that, by means of a radiation coupling, a waveguide, or a cavity resonator, is coupled to the RF antenna (5) of the operating device (4) in order to transmit the radio signal to outside the luminaire housing (1), wherein the slot antenna (2) is located on a planar surface of the metallic luminaire housing and has a length corresponding substantially to half or a multiple of half the wavelength of the radio wave transmitted from the RF antenna, wherein the luminaire has several LED illuminants (6) in strip-shaped LED modules, and the strip-shaped LED modules and groups of aligned slots (2) are arranged alternatingly next to one another on the same side of the luminaire housing (1), wherein the luminaire has a transparent cover (3) which covers the slot and the strip-shaped LED modules.

2. The luminaire according to claim 1, wherein the cavity resonator is formed by the metallic luminaire housing (1).

3. The luminaire according to claim 1, wherein the slot antenna (2) is a slot group antenna having several slots in the planar surface of the metallic housing, where each slot has a length corresponding substantially to half or a multiple of half the wavelength of the radio wave transmitted from the RF antenna, and at least two slots aligned with respect to their main extension direction are separated by a distance greater than half the wavelength of the radio wave transmitted from the RF antenna.

4. The luminaire according to claim 3, wherein the slot group antenna is arranged on one side of the metallic luminaire housing (1) on which the at least one illuminant (6) is arranged.

5. The luminaire according to claim 3, wherein the slot of the slot antenna (2) runs in its main extension direction at least partially parallel to an edge of the luminaire.

6. The luminaire according to claim 1, wherein the operating device (4) has a housing on which is arranged the RF antenna (5) for transmitting and receiving the radio signal.

7. The luminaire according to claim 1, wherein the slot antenna (2), which is coupled to the antenna (5) of the operating device (4) by means of the radiation coupling, the waveguide, or the cavity resonator, is one of two slot antennas which are arranged on two different sides of the luminaire housing (1).

8. The luminaire according to claim 1, wherein the luminaire has several of the operating devices (4) with an RF antenna (5) and several of the slot antennas (2), and each RF antenna (5) is coupled to another slot antenna (2) by means of the radiation coupling, the waveguide, or the cavity resonator.

9. The luminaire according to claim 1, wherein
- a dielectric filler material is arranged in the slot of the slot antenna (2), or
- the dielectric material covers the slot at least on one side of the slot of the slot antenna (2).

10. The luminaire according to claim 1, wherein the slot of the slot antenna (2) does not have a rectangular shape.

11. The luminaire according to claim 10, wherein the edge is an edge of the luminaire housing (1) or an edge of a transparent cover (3) of the luminaire.

12. The luminaire according to claim 10, wherein the slot is at least part of a character applied to the luminaire.

13. The luminaire according to claim 1 wherein the RF antenna (5) in the operating device (4) also receives a receives radio signals.

14. A luminaire, having:
- at least one illuminant (6),
- a metallic luminaire housing (1), and
- at least one operating device (4), arranged in the metallic luminaire housing (1), for the at least one illuminant (6), wherein
- the operating device (4) has an RF antenna (5) for transmitting a radio signal, and the luminaire housing (1) has at least one slot antenna (2) that, by means of a radiation coupling, a waveguide, or a cavity resonator, is coupled to the RF antenna (5) of the operating device (4) in order to transmit the radio signal to outside the luminaire housing, wherein the at least one slot antenna (2) is arranged on one side of the metallic luminaire housing (1) on which the at least one illuminant (6) is arranged, and the luminaire has a transparent cover (3) which covers the at least one slot antenna (2) and the at least one illuminant (6), wherein the luminaire has several LED illuminants (6) in strip-shaped LED modules and several slots forming a group slot antenna in the metallic housing, and further wherein groups of at least two slots are aligned with respect to their main extension direction and separated by a distance greater than half the wavelength of the radio wave transmitted from the RF antenna, and the strip-shaped LED modules and the groups of at least two aligned slots are arranged alternatingly next to one another on said one side of the metallic luminaire housing (1).

* * * * *